United States Patent [19]

Casselbrant

[11] 3,921,794

[45] Nov. 25, 1975

[54] APPARATUS FOR TREATMENT OF MATERIAL IN A CHANNEL

[75] Inventor: Sven Gustav Casselbrant, Lidingo, Sweden

[73] Assignee: Sven Casselbrant & Co., Lidingo, Sweden

[22] Filed: Mar. 13, 1974

[21] Appl. No.: 450,609

[30] Foreign Application Priority Data

Mar. 16, 1973 Sweden .............................. 7303755

[52] U.S. Cl. ...................................... 198/215; 259/3

[51] Int. Cl.² .......................................... B65G 33/00

[58] Field of Search ........... 198/215, 214, 217, 213, 198/216, 209; 222/239–242, 236, 237; 239/675; 100/144, 145, 146, 150, 185; 259/81, 89, 3

[56] References Cited

UNITED STATES PATENTS

| | | | |
|---|---|---|---|
| 860,706 | 7/1907 | Trump | 198/217 X |
| 1,225,172 | 5/1917 | Privett | 198/209 X |
| 2,547,151 | 4/1951 | Braeseke | 259/3 X |
| 2,977,873 | 4/1961 | Crane et al. | 198/213 X |
| 3,102,716 | 9/1963 | Frenkel | 100/145 |

FOREIGN PATENTS OR APPLICATIONS

| | | | |
|---|---|---|---|
| 842,692 | 7/1960 | United Kingdom | 259/3 |
| 129,213 | 7/1901 | Germany | 100/150 |

*Primary Examiner*—Robert J. Spar
*Assistant Examiner*—James M. Slattery
*Attorney, Agent, or Firm*—Flynn & Frishauf

[57] ABSTRACT

An apparatus for compression of a material in a channel by means of helical vanes protruding into the channel. The channel is formed by a number of sequentially and coaxially arranged, rotatable, annular units of which at least two on the inner surface are equipped with helical vanes. The screw direction of the said vanes is reversed from unit to unit in the said sequence and the units with different screw directions are arranged to be rotated in opposite directions.

6 Claims, 1 Drawing Figure

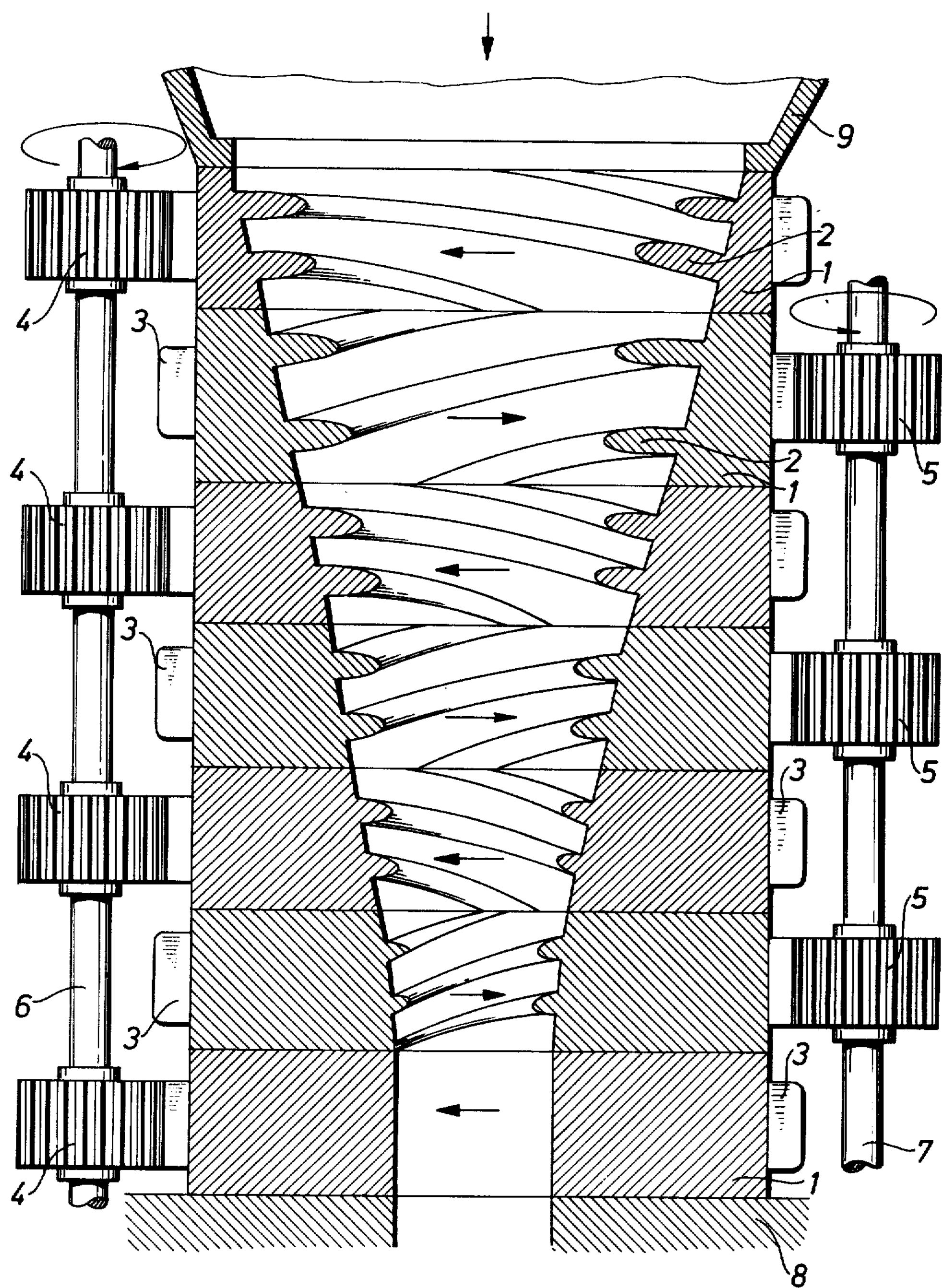
9
2
1
2
1
3
4
5
3
5
3
5
6
3
3
7
4
1
8

APPARATUS FOR TREATMENT OF MATERIAL IN A CHANNEL

This invention relates to an apparatus for treatment (i.e. compression and/or transport) of a material in a channel, the said apparatus being of the kind which incorporates helical vanes protruding into the channel.

BACKGROUND OF THE INVENTION

Conventional devices of this kind normally comprise a press and/or transport screw arranged in the center of a channel limited by fixed walls. With this type of apparatus it is difficult to attain very high pressures without the material tending to accompany the rotation of the screw. Moreover, problems are encountered in certain applications on account of disturbances in the material flow at the end of the screw. A center screw can also act obstructively in compression of bulky goods and causes such goods to be completely disintegrated in connection with compression and transport. In a known improvement of apparatus of this kind the limiting walls of the channel have been constructed in the form of a rotatable sleeve with internal, helical vanes. Not even with this apparatus, however, is it possible to avoid the problems encountered with a center screw, which among other things means that the channel through which the material is to be fed is annular in shape. An apparatus of this kind, moreover, is relatively complicated in its design.

The main object of the present invention is to provide apparatus for compression and/or transport of a material in a channel, which apparatus makes it possible to attain very high press forces and in which no problems are encountered in consequence of a screw located in the center of the channel.

SUMMARY OF THE INVENTION

An apparatus according to this invention which satisfies the said requirements is characterized in that it features two or more sequentially and co-axially arranged, rotatable, annular units, which together form the said channel, in that at least two of the units on the inner surfaces are equipped with at least one helical vane each, in that the screw direction of the said vanes is reversed from unit to unit in the said sequence, and in that units with different screw directions are arranged to be rotated in opposite directions.

On account of the different rotational directions of adjacent units this apparatus enables the surfaces of the said units, which are the only surfaces to touch the material, to attain a relatively high speed in relation to the material, which causes motional friction and results in an effective feeding of the material through the channel. A further advantage is that the problem with an obstructive inner screw, which among things causes the material to be disintegrated, is eliminated. This enables—upon utilization of units which are so constructed and arranged that the channel has a successively decreasing flow area—bulky goods, among other things, to be compressed under the influence of only the outer sections thereof, i.e. it can be compressed from outside without being completely disintegrated.

BRIEF DESCRIPTION OF THE DRAWING

The invention will be described in greater detail in the following description, wherein reference is made to the accompanying drawing, which shows a vertical section through an embodiment of an apparatus according to the invention.

DETAILED DESCRIPTION OF ILLUSTRATED EMBODIMENT

Reference numeral 1 designates a plurality of annular units arranged to form a through-going or internal channel 10. In the illustrated embodiment, the units 1 are so constructed that the internal channel 10 has a successively decreasing flow area from its upper end, the inlet end, to its lower end, the outlet end. The units 1 are arranged to be rotatable relative to each other. In the embodiment shown in the Figure all the units except the lowermost one are equipped on their inner surfaces with helical vanes 2. The screw direction for these helical vanes switches from unit to unit and the units 1 are arranged to be rotated in such a manner that units with a common screw direction are rotated in the same direction and so that material supplies to the inlet end of the channel is fed in the downward direction towards its outlet end. The units 1 are rotated via gear rings 3 fitted round their outer surfaces, which gear rings interact with gearwheels 4 and 5 mounted on the shafts 6 and 7 respectively. The column array of units 1 is fixed between a lower plate 8, which may incorporate a nozzle with a wanted profile, and an upper, funnel-shaped means 9 intended to facilitate the feeding of material to the apparatus.

The described apparatus can be used for example for compression and/or extrusion of or for pressing out of moisture from material fed to the inlet end of the apparatus. The material will then, on account of the rotation of the annular units 1 in the directions shown by the arrows, be pressed downwards by the helical vanes 2 of the units into the converging channel 10 during simultaneous compression. Since adjacent units rotate in opposite directions there is then no risk that the material will participate in the rotation, since the only surface which touches the material during its passage through the channel continuously switches direction of rotation. As the rings can thus rotate very quickly in relation to the material, motional friction is contionuously obtained between the material and the walls of the channel, resulting in effective feed of the material and allowing very high press forces on the material to be attained.

A major advantage of the described apparatus is thus that it does not embody any stationary surfaces to which the material can adhere. Since, in addition, the need for a center screw has been completely eliminated, no problems are encountered at the end of the channel on account of undesirable flow phenomena at the bottom end of such a center screw. The lack of a center screw also means that an open circular channel is obtained to which, for example, very bulky goods, such as branches from trees, cardboard packaging, metal scrap such as car wrecks ets., can easily be admitted, whereafter the material will be compressed during its passage through the channel under the influence of only the outer parts of the material. No complete disintegration of the material, as must take place in an apparatus equipped with a center screw, is thus necessary.

If the apparatus is intended for moisture removal, suitable draining passages can be arranged between the annular units. In extrusion, for example, it can be desirable to equip certain of the rings with heating means. For spraying of a solid, circular profile, the apparatus can appropriately be terminated with a ring without internal vanes. It can, however, be utilized for extrusion of any wanted profile, a nozzle then being fitted after the last ring. Certain of the other rings can also, if so desired, be provided with smooth inner surfaces, in which case in addition one or more rings can have a constant cross-sectional area for formation of a cylindrical section. If the apparatus is intended solely for transport of a material all rings can have the same inside diameter. In order to avoid cutting or grinding up of the material at the transitions between the different rings, the vanes can be so constructed that they end some distance inside the end face of the respective ring. In compression of branches and packagings, for instance, the inner edge of the vanes can, for disintegration or cutting, as applicable, be made in the form of a cutting edge or be provided with teeth of saw-tooth design. In extruding, the wanted additives such as adhesive, etc., can be supplied at the inlet or further along in the channel to achieve the wanted binding in the material and/or the wanted surface character of the extruded goods. The number of helical vanes and their pitch can be chosen as required. The pitch of the vanes can also be varied along the length of the channel.

As is evident from the above desciption, the apparatus according to the invention can be varied in numerous ways for adaptation to a wide range of different applications. Common features of the different embodiments are, however, that they comprise a number of annular units, of which at least two are equipped with helical vanes in opposite screw directions and that units with different screw directions are arranged to be rotated in opposite directions.

What we claim is:

1. Apparatus for treatment of material, comprising:
   a plurality of sequentially and co-axially arranged, rotatable, annular units (1), the central openings of said annular units being substantially aligned to form an elongate material treating channel (10) having an inlet and an outlet;
   at least one helical vane (2) provided on the inner surface of each of at least two of said annular units (1), each helical vane (2) having a predetermined screw direction, the screw directions of the said helical vanes being reversed from unit to unit in said sequentially arranged annular units; and
   means (3–7) external of said channel (10) for rotating annular units with vanes having different screw directions in opposite directions.

2. Apparatus according to claim 1, wherein the said annular units (1) are arranged and have inner openings so as to form a substantially circular channel (10) with a larger flow area at the inlet end than at the outlet end.

3. Apparatus according to claim 2, wherein said annular units (1) are arranged to form a channel (10) with a successively decreasing flow area from inlet to outlet.

4. Apparatus according to claim 1, wherein the annular unit (1) located closest to the outlet of the channel (10) has a smooth inner surface.

5. Apparatus according to claim 1, wherein said helical vanes (2) of the said annular units (1) end interior of the end surfaces of the respective annular unit.

6. Apparatus according to claim 1, wherein said helical vanes (2) have inward-directed sharp cutting edges.

* * * * *